Figure 3:
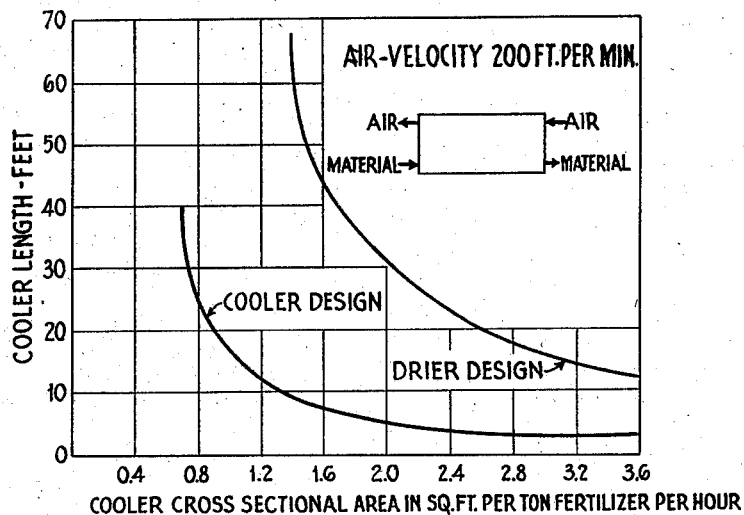

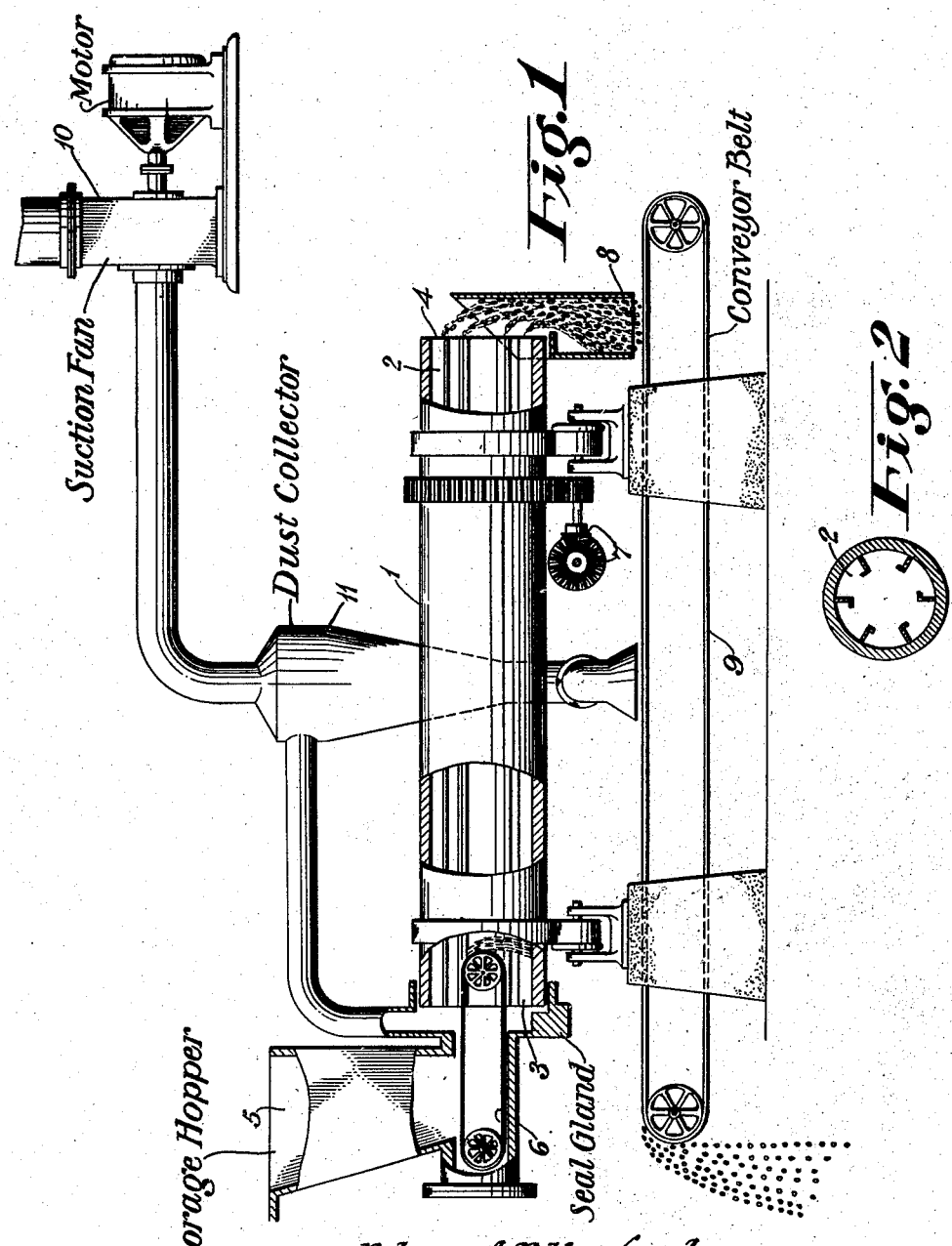

Patented Dec. 15, 1942

2,305,078

UNITED STATES PATENT OFFICE 2,305,078

COOLING OF COMMINUTED MATERIAL

Edward F. Harford, Arden, Del., assignor to E. I. du Pont de Nemours & Company, Wilmington, Del., a corporation of Delaware Application February 28, 1940, Serial No. 321,183

2 Claims. (Cl. 34—20)

This invention relates to cooling of warm, moist, comminuted or granulated solids and more particularly to the cooling of warm, moist fertilizer materials.

It has become well established as sound practice in the fertilizer trade to introduce neutralizing agents such as calcium cyanamide, hydrated lime or ammonia as such and in the form of ammoniating solutions, into superphosphates or mixed fertilizers. The amount of neutralizing agents which it has been feasible to add in any given instance has, however, been limited because of the heat generated by reaction between the neutralizing agent and the acid portion of the superphosphate or other acidic fertilizer material. The sustained high temperatures in storage piles of the resulting fertilizers has caused loss of available $P_2O_5$, undesirable caking and delayed bagging.

Various proposals have been made for overcoming the disadvantages encountered in the resulting neutralized fertilizers, including cooling of the treated materials during and after neutralization. Based on the design information previously available, however, cooling equipment appeared so large with resultant high cost of installation, maintenance, and use that operation would not be economically feasible. For example, in the case of water cooling the rise in temperature of a pound of water practically equals the drop in temperature of 4 pounds of fertilizer, i. e. to cool a pound of fertilizer 50° F. a pound of water must be raised 13° F. A water tube cooler using 60° F. inlet water, to cool 30 tons of fertilizer per hour from 160° F. to 110° F., would require a rotary shell 6 ft. in diameter by 60 ft. long. Under these conditions the operating cost and equipment size would be prohibitive, particularly for tonnages normally encountered in handling fertilizer.

It is an object of this invention to overcome the disadvantages of the prior art, including those hereinbefore outlined, by an improved process and apparatus adapted to lower the temperature of warm, moist, comminuted or granulated materials.

It is a further object of this invention to provide a new and improved process and apparatus for cooling fertilizer materials.

Other objects and advantages of this invention will be apparent from the following description.

According to this invention comminuted or granulated warm, moist materials may be cooled and a portion of the moisture present in such materials may be removed by passage of such materials through a substantially horizontal, rotary, cylindrical shell, such as diagrammatically shown in the accompanying drawings, in contact with a stream of air, the dimensions and capacity of the shell being related as in the expression:

$$\frac{A\sqrt{L}}{W}=K$$

where values of K lie between 1 and 5, and wherein A represents cooler cross sectional area in square feet, W represents material throughout in tons per hour and L represents cooler length in feet. On the inside of the shell are affixed flights or lifts extending substantially from the inlet to the exit. The flights are preferably curved or bent but their primary function is to distribute material efficiently throughout the air stream and also to cause the material to pass through the apparatus. The air stream moves through the cooler co-currently or counter-currently, preferably the latter, to the flow of material.

The cooling apparatus of this invention is preferably so placed in a manufacturing establishment that hot, freshly produced material can be passed through it immediately upon discharge from the producing or formulating equipment and on its way to storage bins. Arrangements should also be made in placing of the apparatus so that mixtures which may heat up in storage may similarly be easily brought to the cooling unit.

In the accompanying drawings I have illustrated an apparatus embodying the features of my invention, and in these drawings:

Figure I is a diagrammatic sketch of a suitable casing or shell 1, preferably in the form of a cylinder within which are mounted flights or lifts 2, shown in Figure II, which is a cross section of the shell 1 of Figure I. These flights 2 are preferably curved or bent and extend substantially from the inlet 3 to outlet 4 of the shell 1, so as to cause material to pass through the shell 1.

In operation, material to be cooled is placed in a storage hopper 5 and thence conducted by a belt conveyor 6 to the shell 1 at the inlet thereof 3. The shell 1 is, during operation, continuously rotated by shell driving gears 7 and the treated material is passed through the shell 1, by means of the lifts 2 to the outlet 4 where it is collected in a cooler discharge hopper 8 and conveyed to storage by a belt conveyor 9. During passage of the material through the shell 1, a stream of air is constantly passed from the material outlet through the shell 1 by means of a fan and motor assembly 1 which also actuates a cyclone dust collector 11 serving to remove dust and fines resulting from agitation of the material passing through the shell 1. A seal gland 12 around the air discharge end of the cooler serves to conduct the fines and dust in the air stream to the cyclone dust collector 11.

Practically all of the fertilizer produced contains upwards to 15% free moisture, although usually its moisture content is in the more restricted range of from about 3 to 10%. Due to the extremely large latent heat of vaporization of water, evaporation of even a small portion of this water will remove a large amount of the heat. In fact approximately one-half the cooling is obtained by evaporation of water. Thus, in application of the invention to fertilizer cooling, the amount of water evaporated varies from 0.5% to 1.5% to the total weight of the fertilizer. I have found that evaporation of 1% water will lower the fertilizer temperature approximately 35° F.

The balance of the heat contained in the material to be cooled is removed, according to this invention, by raising the temperature of the air being passed through the cooling apparatus. Inasmuch as the vaporization of moisture is extremely rapid and the transfer of the remaining heat from the solid to the air requires much less time than usually assumed in drier calculations, I have found that the cooler volume may be as low as one-fourth that required on the basis of previous knowledge, e. g. rotary drier design equations.

For purposes of cooler design, according to the present invention, the following variables should be considered:

(1) *Inlet and exit material temperatures.*—The inlet material temperature may vary over a wide range, depending upon the quantity of neutralizing agents added and in the case of ammoniated phosphatic mixtures this temperature may be of the order of 120 to 200° F. In applying the present invention to cooling of fertilizers, particularly ammoniated fertilizer, the exit material temperature should be about 110° F. or lower in order to avoid the reversion of available phosphates, to prevent hydrolysis of urea if it is present in the fertilizer, and to allow the material to be bagged soon after mixing.

(2) *Inlet and exit air temperature.*—Since the greater portion of fertilizer is mixed between January and March, the air available for cooling usually will not exceed 60° F. except in the far South. Temperature of the air leaving the cooler depends upon the efficiency of heat transfer which is governed by air to material contact, length of cooler, and time of material hold-up.

(3) *Required for cooling.*—The velocity of the air should be low enough to prevent any appreciable amount of fine material from being carried out of the cooler in the air stream. I have found that air velocity should be below 600 linear ft. per minute and preferably about 200 to 400 linear ft. per minute.

The volume of air necessary is that required to carry away the water vaporized from the material being cooled, and also such a volume that its relative humidity remains below a point at which the treated material will be hygroscopic. I have found that this air volume should be at least 3 cubic feet of air per pound of material treated and preferably 5 to 8 cubic feet of air per pound of material treated.

Figure 4:
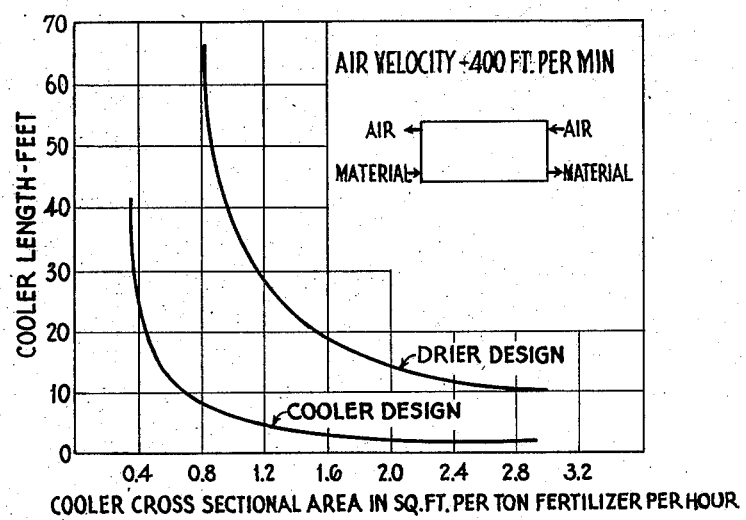

All of these variables may be related to one another on a practical basis by affixing certain values to some of them. The cooler length in feet, I have found to be a comparatively simple function of the cooler cross sectional area per square ft. per ton fertilizer per hour as shown in the charts which are embodied in Figures 3 and 4 and which are made a part of the present application. In these drawings, the cooler length in feet is plotted against cooler cross sectional area in square feet per ton of fertilizer per hour. Drawing #3 represents plotting of these relationships under air flow of 200 linear feet per minute and Drawing #4 similarly shows the same relationship with air flow of 400 linear feet per minute. The mathematical expression for this practical relationship (which has been given graphically in the figures referred to) is $$\frac{A\sqrt{L}}{W}=K$$

The values for the constituents of this formula have been previously described.

Values for "K" have been found to be as follows:

| Design data employed for calculations | Air velocity ft. per min. | K |
| --- | --- | --- |
| Cooler | 200 | 4.1 |
| Do | 400 | 2.2 |
| Drier | 200 | 11.7 |
| Do | 400 | 6.6 |

For example, when a value of 4.0 is used for K, a cooler for 30 tons fertilizer per hour can be designed as follows:

Assume: (1) the air enters the cooler at 60° F. and 65% relative humidity; (2) 1% water is vaporized, based on the fertilizer weight; (3) the air leaves the cooler at 100° F. and 55% relative humidity; (4) an air velocity of 280 linear ft. per minute is used.

By the use of humidity charts these conditions require 8 cu. ft. of air per pound of fertilizer. The total air volume would be 8 times 30 times 2,000 equals 480,000 cu. ft. per hour. For any given quantity of fertilizer to be cooled, it is only necessary to employ a simple well-known engineering calculation to determine the cross-sectional area of the cylinder; that is, by dividing the cubic feet of air required per minute by the linear velocity the cross-sectional area is immediately obtained in square feet. Since this area equals $\pi$ times the square of the cylinder's radius, it is thus easy to calculate the diameter of the cylinder by means well known to one skilled in the art. Under the air flow conditions designated the cooler would be 6 ft. in diameter and the length would be $$4=\frac{\sqrt{L.\pi(3)^2}}{30}$$

$$L=18 \text{ ft.}$$

On the other hand on the basis of rotary drier design wherein K has values around 10, the length would be $$10=\frac{\sqrt{L.\pi(3)^2}}{30}$$

$$L=112 \text{ ft.}$$

Various changes may be made in the details and preferred embodiments of this invention without departing therefrom or sacrificing any of the advantages thereof.

I claim:

1. A method of cooling warm, moist comminuted fertilizer initially at a temperature between 120° F. and 200° F. which comprises passing said material through an approximately horizintal, rotary, cylindrical vessel in contact with a counter-current stream of air initially at atmospheric temperature, the relationship between comminuted material throughout and vessel dimensions being represented by the formula:

$$\frac{A\sqrt{L}}{W}=K$$

wherein A equals vessel cross-sectional area in square feet, W equals comminuted material throughout in tons per hour, L equals vessel length in feet and K is a constant of about 4, the air stream velocity being about 280 linear feet per minute and the air volume per pound of material treated being about 8 cubic feet.

2. A method of cooling warm, moist comminuted fertilizer initially at a temperature between 120° and 200° F. which comprises passing said material through an approximately horizontal, rotary, cylindrical vessel in contact with a counter-current stream of air initially at atmospheric temperature, the relationship between comminuted material throughput and vessel dimensions being represented by the formula:

$$\frac{A\sqrt{L}}{W}=K$$

wherein A equals vessel cross-sectional area in square feet, W equals comminuted material throughout in tons per hour, L equals length in feet and K is a constant of about 4, the air stream velocity being about 200 to 400 feet per minute and the air volume per pound of material treated being about 5 to 8 cubic feet.

EDWARD F. HARFORD.

CERTIFICATE OF CORRECTION.

Patent No. 2,305,078.                                December 15, 1942.

EDWARD F. HARFORD.

It is hereby certified that error appears in the printed specification of the above numbered patent requiring correction as follows: Page 3, first column, lines 11 and 18, and second column, line 15, for "throughout" read --throughput--; and that the said Letters Patent should be read with this correction therein that the same may conform to the record of the case in the Patent Office.

Signed and sealed this 9th day of February, A. D. 1943.

(Seal)

Henry Van Arsdale,
Acting Commissioner of Patents.